Nov. 7, 1967            A. NUTTING            3,350,862
MODULAR SUPPORT FRAME AND FILTER MEDIA ASSEMBLY
Filed July 22, 1965            2 Sheets-Sheet 1
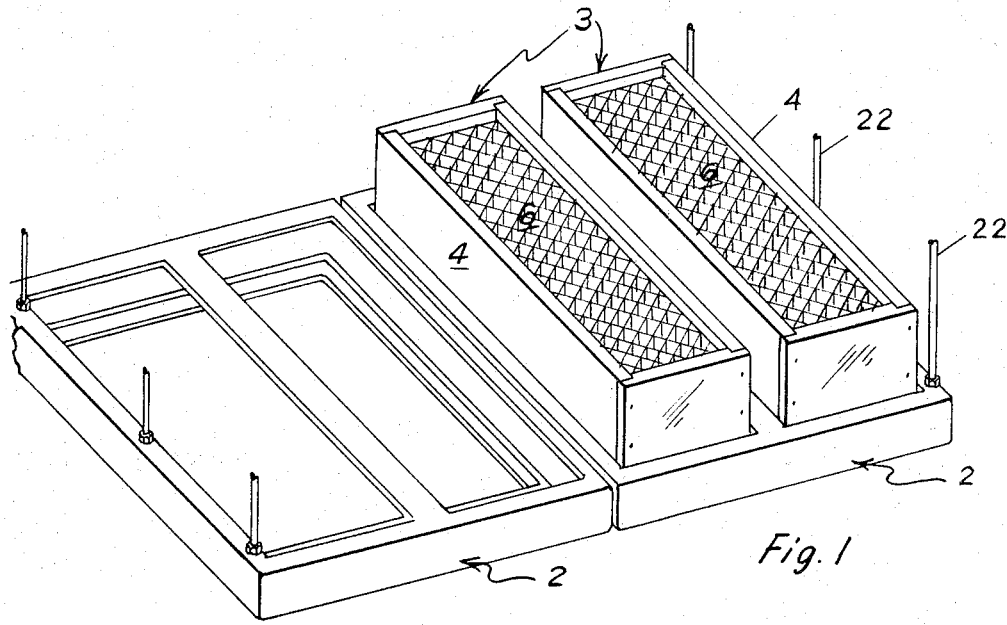
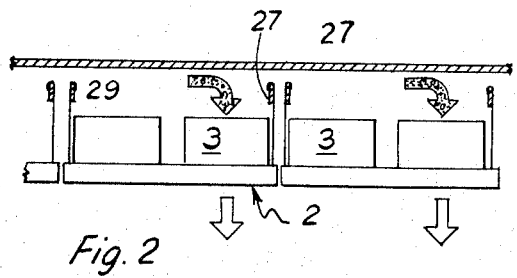
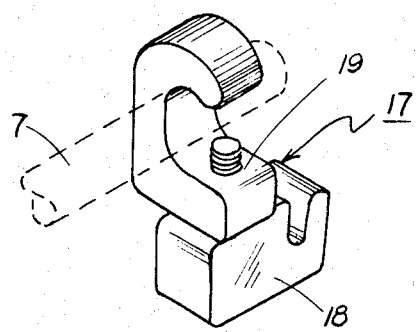
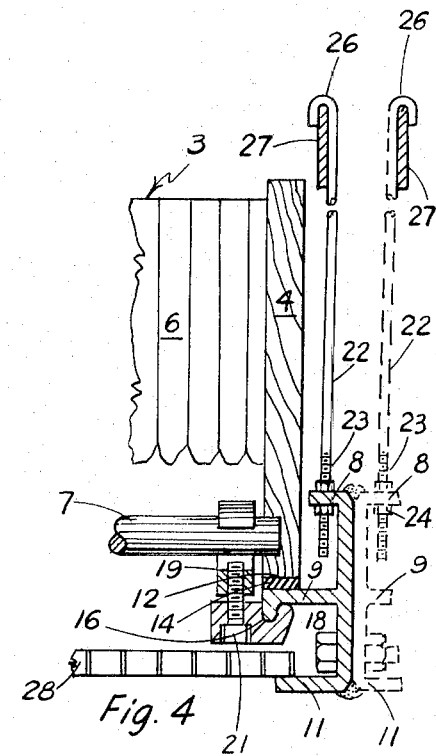
INVENTOR.
Arthur Nutting
BY
Ralph B. Brick
ATTORNEY Nov. 7, 1967 A. NUTTING 3,350,862
MODULAR SUPPORT FRAME AND FILTER MEDIA ASSEMBLY
Filed July 22, 1965 2 Sheets-Sheet 2

INVENTOR.
Arthur Nutting
BY
Ralph B. Brick
ATTORNEY

United States Patent Office 3,350,862
Patented Nov. 7, 1967

3,350,862
MODULAR SUPPORT FRAME AND FILTER
MEDIA ASSEMBLY
Arthur Nutting, Louisville, Ky., assignor to American
Air Filter Company, Inc., Louisville, Ky., a corporation
of Delaware
Filed July 22, 1965, Ser. No. 473,971
9 Claims. (Cl. 55—493)

ABSTRACT OF THE DISCLOSURE

The present invention is directed to an improved gas filter apparatus including a modular open-ended support frame with inwardly directed ledges to receive a unit filter media assembly thereon, the support frame being adapted to be suspended from suitably adjusted rod suspension means which, in turn, can be mounted to the superstructure of a building.

The present invention relates to gas filter structure and more particularly to a structure for supporting a plurality of unit gas filters in wall form or ceiling form arrangement.

In accordance with the present invention, a novel, straightforward and economical to construct arrangement for assembly unit filters into substantially rigid modular frames is provided. The novel structural arrangement of the present invention permits rapid and secure installation, providing filter units which are readily transportable and which are easily handled for mounting. In addition, the present invention provides a novel and expedient manner for securing unit filters in modular support frames to avoid possible shifting in such frames. Further, the present invention provides an arrangement for mounting modular support frames in gas sealed relationship to each other at preselected, readily adjustable positions in relation to the overall superstructure in which the modular support frames are installed. Although the structure of the present invention has particular adaptability in ceiling installations of various sizes and gas capacities, it is to be understood that the structure of the present invention also can be utilized for other planar walls of a superstructure.

Various other features of the present invention will become obvious to one skilled in the art upon reading the disclosure set forth hereinafter.

More particularly, the present invention provides an improved gas filter structure comprising: a modular open-ended outer support frame having an inwardly-turned peripheral ledge; an open-ended filter unit including a media supporting border frame and filter media means disposed therein, the border frame being sized to be disposed within the outer support frame so that one edge face of the border frame engages against the inwardly-turned peripheral ledge of the outer support frame; rod suspension means connected at one end to the outer support frame and having connection means at its opposite end for mounting to a superstructure, the rod suspension means including adjusting means to align the position of the outer support frame relative the superstructure to which it is to be connected; and filter unit retention means to hold an edge face of the border frame of the filter unit in fast engagement against the inwardly-turned peripheral ledge of the outer support frame.

It is to be understood that various changes can be made in the arrangement, form and construction of the apparatus disclosed herein without departing from the scope or spirit of the present invention.

Referring to the drawings which disclose an advantageous embodiment of the present invention and several modifications thereof:

FIGURE 1 is a partially broken away isometric view of a pair of open-ended filter units mounted in one of a pair of assembled modular open-ended outer support frames;

FIGURE 2 is a reduced cross-sectional view of a portion of a ceiling superstructure incorporating the novel support structure of FIGURE 1;

FIGURE 3 is an enlarged isometric view of one type of filter unit retention device;

FIGURE 4 is a cross-sectional end view of a portion of the novel support structure incorporating the filter unit retention device of FIGURE 3 and further disclosing novel rod suspension means for suspending the filter structure;

Figure 5:
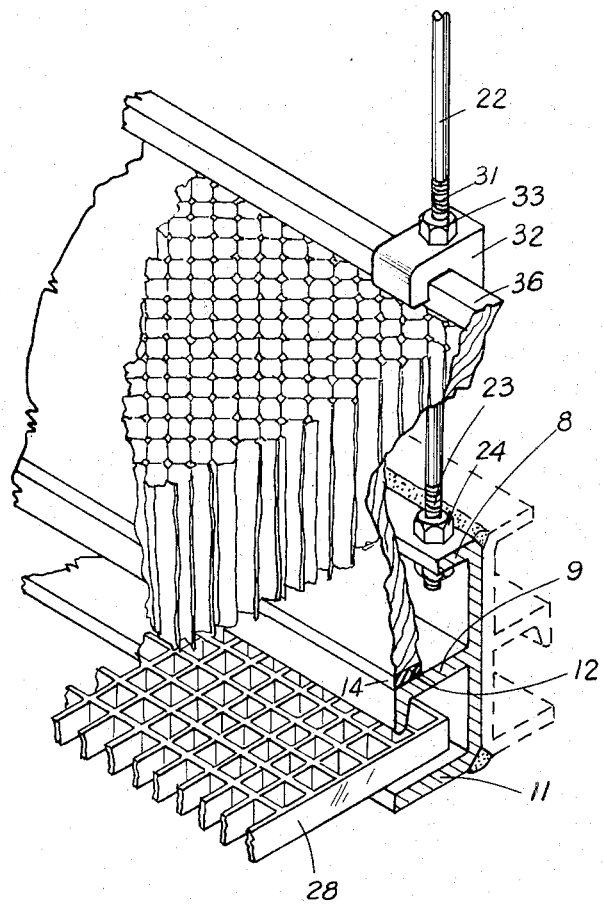
FIGURE 5 is a partially broken away isometric view of a portion of the novel structure incorporating another type of filter unit retention device which can be utilized.

Referring to FIGURES 1 and 2 of the drawings, a pair of modular open-ended outer support frames 2 are disclosed, one of which is disclosed as supporting a pair of open-ended filter units 3. The filter units 3 can be any one of several types known in the art, and as disclosed, each includes a rectangular border frame 4 which serves to support filter media 6 disposed therein. As can be seen in FIGURE 4 of the drawings, extending between opposite walls of border frame 4 of the filter unit 3 in spaced relationship to the face of media 6 is a rod 7. A suitable number of these rods can be provided in spaced relationship to each other in each filter unit 3. Rods 7 can be in the form of dowel bars, and as disclosed, can be embedded firmly in the walls of frame 4. These rods, in addition to serving as a protection device for the media and as a handle member during transport and installation, further serve as grip means after the filter unit 3 has mounted on its outer support frame 2 so that the filter unit can be retained in fixed position in a manner as described hereinafter.

The modular support frame 2 which can be formed from any one of a number of suitably rigid fabrication materials advantageously can be formed from a lightweight extruded aluminum metal. As disclosed, each outer support frame 2 is capable of supporting two filter units; however, it is to be understood that other modular frame configurations are also possible.

Referring to FIGURES 4 and 5 of the drawings, it can be seen that support frame 2 is provided with a set of three inwardly-turned integral, spaced and parallel, peripheral support ledges 8, 9, and 11, respectively. The intermediate ledge 9, which serves as the support ledge for filter unit 3, is of greater breadth than ledge 8, which ledge is sized to permit filter unit 3 to pass therethrough so that edge face 12 of the filter unit 3 rests on ledge 9. As shown, a suitable, soft sealing gasket 14 can be provided intermediate edge face 12 of filter unit 3 and the face of ledge 9. This gasket can be made from any one of a number of known, suitable materials such as cork or rubber. It is to be understood that the inwardly-turned ledges can extend around the complete periphery of support frame 2, or, if desired, can extend in preselected intermittent fashion therealong. The intermediate ledge 9 is provided with downwardly extending lip 16, this lip serving to be engaged by hook-shaped retainer 17. Retainer 17 is comprised of a pair of hook members 18 and 19, respectively. Member 18 engages with downwardly-turned lip 16 and member 19 engages with rod 7 of the filter unit 3. It is to be noted that hook members 18 and 19 are pivotally connected to each other for relative displacement to permit one member to readily engage with lip 16 and the other to readily engage with rod 7. To accomplish this, a suitable screw 21 serves as the connecting member. It is only necessary to turn screw 21 in an appropriate direction to tighten or release the hook retention member and thus hold or release the filter unit 3 with respect to lip 16 of ledge 9.

As can further be seen in FIGURE 4 of the drawings, outer support frames 2 can be provided with suspension rods 22. Rods 22 are provided at one end thereof with threaded end portions 23. These threaded end portions 23 pass through suitable apertures (not shown) in ledges 8 of support frames 2. Nuts 24 are provided on either side of each ledge 8 to engage with threaded portion 23 of a rod to adjust the relative position of the rod and thus the relative position of the frame. In this connection, it is to be noted that each of rods 22 is provided at its end opposite the threaded end portion with hook member 26. The hook members 26 engage rafters 27 of the superstructure from which modular outer support frames 2 are suspended. Thus, it will be obvious from the foregoing description that it is only necessary to change the position of nuts 24 to change the relative position of frames 2 and to align the same. It is to be further noted that modular support frames 2 are provided with air diffusion members 28 which are positioned upstream of filter units 3, the diffusion members 28 being sized to rest on ledges 11 of the modular frames. Not only do these diffusion members serve to provide uniform distribution of air as it passes through plenum 29 (FIGURE 2) of the ceiling, but in addition, these diffusion members serve to provide an improved aesthetic appearance to the structural support arrangement.

Referring to FIGURE 5 of the drawings, it can be seen that suspension rods 22 can be modified in such a manner as to each include a second threaded portion 31, this second threaded portion 31 having hook member 32 slidably mounted relative thereto and having a nut 33 positioned on the threaded portion immediately above the hook member. With such an arrangement, it is possible for hook 32 to grip edge face 36 of filter unit 3 opposite edge face 12 which engages with intermediate ledge 9 on which the filter unit is supported. Thus, a further arrangement is provided wherein filter unit 3 can be held in fast engagement with its intermediate supporting ledge 9 and at the same time be suspended in adjustable manner from rafters 27 of the superstructure.

Figure 6:
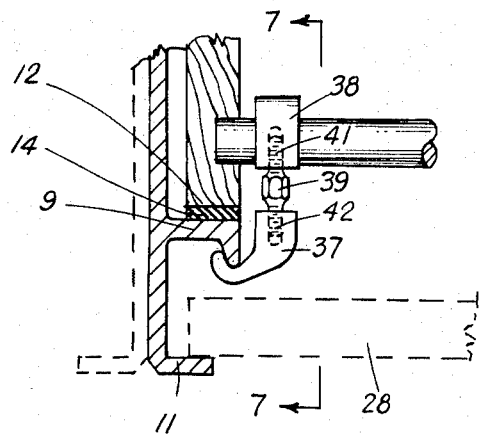
FIGURE 6 is a cross-sectional end view of a portion of the novel support structure incorporating still a further filter unit retention device which can be utilized.
Figure 7:
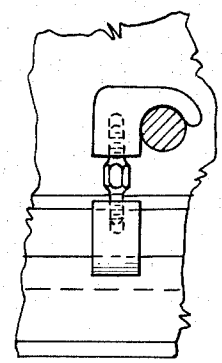
FIGURE 7 is a cross-sectional end view taken in a line passing through the line 7—7 of FIGURE 6.

Referring to FIGURES 6 and 7 of the drawings, a further modification of the hook retention device is disclosed. In this modification, hook members 37 and 38 are pivotally connected together for relative movement to each other by means of turnbuckle nut 39, the turnbuckle nut 39 having oppositely threaded shank portions 41 and 42. It is only necessary to rotate the turnbuckle in such a manner that hook portions 37 and 38 firmly grip the respective lip and rod to urge filter unit 3 into fast engagement with intermediate ledge 9.

As can be seen from the foregoing description, the structure described provides a straightforward and economical arrangement for assembling unit filters into substantially rigid modular frames which can be joined together, sealed and supported in a superstructure in proper alignment in a secure manner with a minimum of operation.

The invention claimed is:

1. An improved gas filter structure comprising: a modular open-ended outer support frame including side walls having extending in a direction substantially normal therefrom an inwardly-turned peripheral ledge; an open-ended filter unit including a filter media supporting border frame having surrounding side walls with filter media means disposed therein, said border frame being of corresponding geometric configuration to said outer support frame and sized to be disposed within said outer support frame so that one edge face of said border frame side walls engages in faced relation against said normally extending inwardly-turned peripheral ledge of said outer support frame; rod suspension means connected at one end to said outer support frame and having connection means at its opposite end for mounting to a superstructure, said rod suspension means including adjusting means to align the position of said outer support frame relative the superstructure to which it is to be connected; said border frame including a hook-receiving member and hook-shaped filter unit retention means cooperable with said hook-receiving member on said border frame holding said edge face of said border frame side walls of said filter unit in fast engagement against said inwardly-turned peripheral ledge of said outer support frame.

2. The apparatus of claim 1, said filter unit retention means being adjustably mounted on said rod suspension means to engage said hook-receiving member on said border frame side walls of said filter unit to urgingly grip the same along an edge face opposite said edge abutting said first ledge of said outer support frame.

3. The apparatus of claim 1, said opposite end of said rod suspension means being of hook shape for ready connection to said superstructure.

4. The apparatus of claim 1, said hook-receiving member being connected to said border frame adjacent the edge face engaging said inwardly-turned peripheral ledge of said outer frame, said filter unit retention means including a hook-shaped retainer member adjustably connected between said hook receiving member and said peripheral ledge.

5. An improved gas filter structure comprising: a modular open-ended outer support frame including side walls having extending in a direction substantially normal therefrom an inwardly-turned peripheral ledge; an open-ended filter unit including a filter media supporting border frame having surrounding side walls with filter media means disposed therein, said border frame being of corresponding geometric configuration to said outer support frame and sized to be disposed within said outer support frame so that one edge face of said border frame side wall engages in faced relation against said normally extending inwardly-turned peripheral ledge of said outer frame, said filter unit having a hook-receiving member connected to said border frame adjacent the edge face engaging said periphedal ledge of said outer frame; and hook-shaped filter unit retention means including a hook-shaped retainer member adjustably connected between said hook-receiving member and said peripheral ledge, said normally extending, inwardly-turned peripheral ledge having a downwardly turned lip portion with which said hook-shaped retainer means engages; said hook-shaped retainer member comprising a pair of hook members pivotally connected for relative displacement to each other with one member engaging with said hook-receiving member of said filter unit and the other engaging with said downwardly turnned lip of said peripheral ledge.

6. The apparatus of claim 5, said hook members being pivotally connected together by a turnbuckle nut including oppositely threaded shank portions engaging said hook members.

7. An improved gas filter structure comprising a generally rectangular modular open-end outer support frame including side walls having extending in a direction substantially normal therefrom an inwardly-turned peripheral ledge; an open-ended filter unit including a filter media supporting border frame of generally rectangular shape including opposed surrounding side walls with filter media means disposed therein, said border frame being of corresponding geometric configuration to said outer support frame and sized to be disposed within said outer support frame so that one edge face of said border frame side wall engages in faced relation against said normally extending inwardly-turned peripheral edge of said outer frame, said filter unit having rod means having its opposite ends fastened to the inner face of and extending between opposite walls of said border frame in spaced relationship to a face of said filter media supported therein and adjacent the edge face of said border frame engaging said peripheral ledge of said outer frame; and hook-shaped filter unit retention means including a hook-shaped retainer member adjustably connected between said rod means and said peripheral ledge.

8. An improved gas filter structure comprising: a modular open-ended outer support frame including side walls having extending in a direction substantially normal therefrom a first inwardly-turned peripheral ledge; an open-ended filter unit including a filter media supporting border frame having surrounding side walls with filter media means disposed therein, said border frame being of corresponding geometric configuration to said outer support frame and sized to be disposed within said outer support frame so that one edge face of said border frame side wall engages in face relation against said first normally extending inwardly-turned peripheral ledge of said outer support frame; said outer support frame having extending in a direction substantially normal therefrom a second inwardly-turned peripheral ledge spaced from said first inwardly-turned ledge and size to permit said filter unit to pass therethrough; rod suspension means having an end connected to said second ledge of said outer frame and an opposite end adapted to be connected to superstructure, said suspension means including adjusting means to align the position of said outer support frame relative the superstructure to which it is to be connected; said border frame including a hook-receiving member and hook-shaped filter unit retention means cooperable with said hook-receiving member on said border frame holding an edge face of said border frame side wall of said filter unit in fast engagement against said first inwardly-turned peripheral ledge.

9. The apparatus of claim 8, a said support frame having extending in a direction substantially normal therefrom third inwardly-turned ledge spaced upstream and co-extensive with said first inwardly-turned ledge; and a gas diffusion grid supported thereon.

References Cited

UNITED STATES PATENTS

| 831,597 | 9/1906 | Bowman | 287—60 X |
|---|---|---|---|
| 1,760,986 | 6/1930 | Jordahl | 55—483 |
| 2,349,158 | 5/1944 | Fowles et al. | 55—484 |
| 2,621,112 | 12/1952 | Schmalenbach | 55—490 |
| 2,907,408 | 10/1959 | Engle et al. | 55—497 |
| 3,001,464 | 5/1961 | Moore | 55—484 |
| 3,089,479 | 5/1963 | Perl. | |
| 3,094,304 | 6/1963 | Linder | 248—215 |
| 3,177,637 | 4/1965 | Davis | 55—501 |
| 3,229,609 | 1/1966 | Larson et al. | |
| 3,280,541 | 10/1966 | Soltis | 55—483 |
| 3,301,167 | 1/1967 | Howard et al. | |

FOREIGN PATENTS

| 541,596 | 5/1957 | Canada. |
|---|---|---|
| 1,209,738 | 8/1959 | France. |
| 1,342,931 | 10/1963 | France. |

HARRY B. THORNTON, *Primary Examiner.*

B. NOZICK, *Assistant Examiner.*